(12) United States Patent
Koo et al.

(10) Patent No.: US 12,389,058 B2
(45) Date of Patent: Aug. 12, 2025

(54) MOBILE TERMINAL AND DISPLAY SYSTEM

(71) Applicant: LG ELECTRONICS INC., Seoul (KR)

(72) Inventors: Changbum Koo, Seoul (KR); Dahee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 18/270,831

(22) PCT Filed: Jan. 4, 2021

(86) PCT No.: PCT/KR2021/000018
§ 371 (c)(1),
(2) Date: Jul. 3, 2023

(87) PCT Pub. No.: WO2022/145553
PCT Pub. Date: Jul. 7, 2022

(65) Prior Publication Data
US 2024/0073470 A1 Feb. 29, 2024

(51) Int. Cl.
*H04N 21/41* (2011.01)
*H04N 21/4363* (2011.01)

(52) U.S. Cl.
CPC ... *H04N 21/41265* (2020.08); *H04N 21/4122* (2013.01); *H04N 21/43637* (2013.01)

(58) Field of Classification Search
CPC ......... H04N 21/41265; H04N 21/4122; H04N 21/43637; H04N 21/41407;
(Continued)

(56) References Cited

U.S. PATENT DOCUMENTS

2013/0005250 A1 1/2013 Kim et al.
2013/0141567 A1* 6/2013 Walker .............. H04M 1/72412
348/135
(Continued)

FOREIGN PATENT DOCUMENTS

EP 3757816 12/2020
KR 20130021712 A * 3/2013
(Continued)

OTHER PUBLICATIONS

European Patent Office Application Serial No. 21915353.3, Search Report dated Apr. 26, 2024, 4 pages.
(Continued)

*Primary Examiner* — John W Miller
*Assistant Examiner* — Omer Khalid
(74) *Attorney, Agent, or Firm* — LEE, HONG, DEGERMAN, KANG & WAIMEY

(57) ABSTRACT

A mobile terminal according to an embodiment of the present disclosure may comprise a NFC module configured to transmit a Near Field Communication (NFC) tagging signal to a remote control device and receive wireless connection information in response to the tagging signal, a Wi-Fi module configured to perform a Wi-Fi connection with a display device using the wireless connection information, and a processor configured to transmit an action request for interworking with the mobile terminal to the display device if the mobile terminal is connected to the display device via Wi-Fi.

11 Claims, 23 Drawing Sheets

(58) Field of Classification Search
CPC ......... H04N 21/42204; H04N 21/4222; H04N 21/43078; H04N 21/43615; H04M 2250/04; H04M 1/72415
USPC .......................................................... 348/734
See application file for complete search history.

(56) References Cited

U.S. PATENT DOCUMENTS

| | | | | |
|---|---|---|---|---|
| 2015/0304590 | A1* | 10/2015 | Sugita | G08C 17/02 |
| | | | | 348/734 |
| 2017/0276426 | A1* | 9/2017 | Jung | H04B 5/72 |
| 2020/0301469 | A1* | 9/2020 | Choi | G06F 3/147 |

FOREIGN PATENT DOCUMENTS

| | | |
|---|---|---|
| KR | 1020130021712 | 3/2013 |
| KR | 1020140029342 | 3/2014 |
| KR | 10-1383242 | 4/2014 |
| KR | 1020140089489 | 7/2014 |
| KR | 1020150068686 | 6/2015 |
| WO | 2014097755 | 6/2014 |

OTHER PUBLICATIONS

PCT International Application No. PCT/KR2021/000018, International Search Report dated Sep. 30, 2021, 4 pages.

* cited by examiner

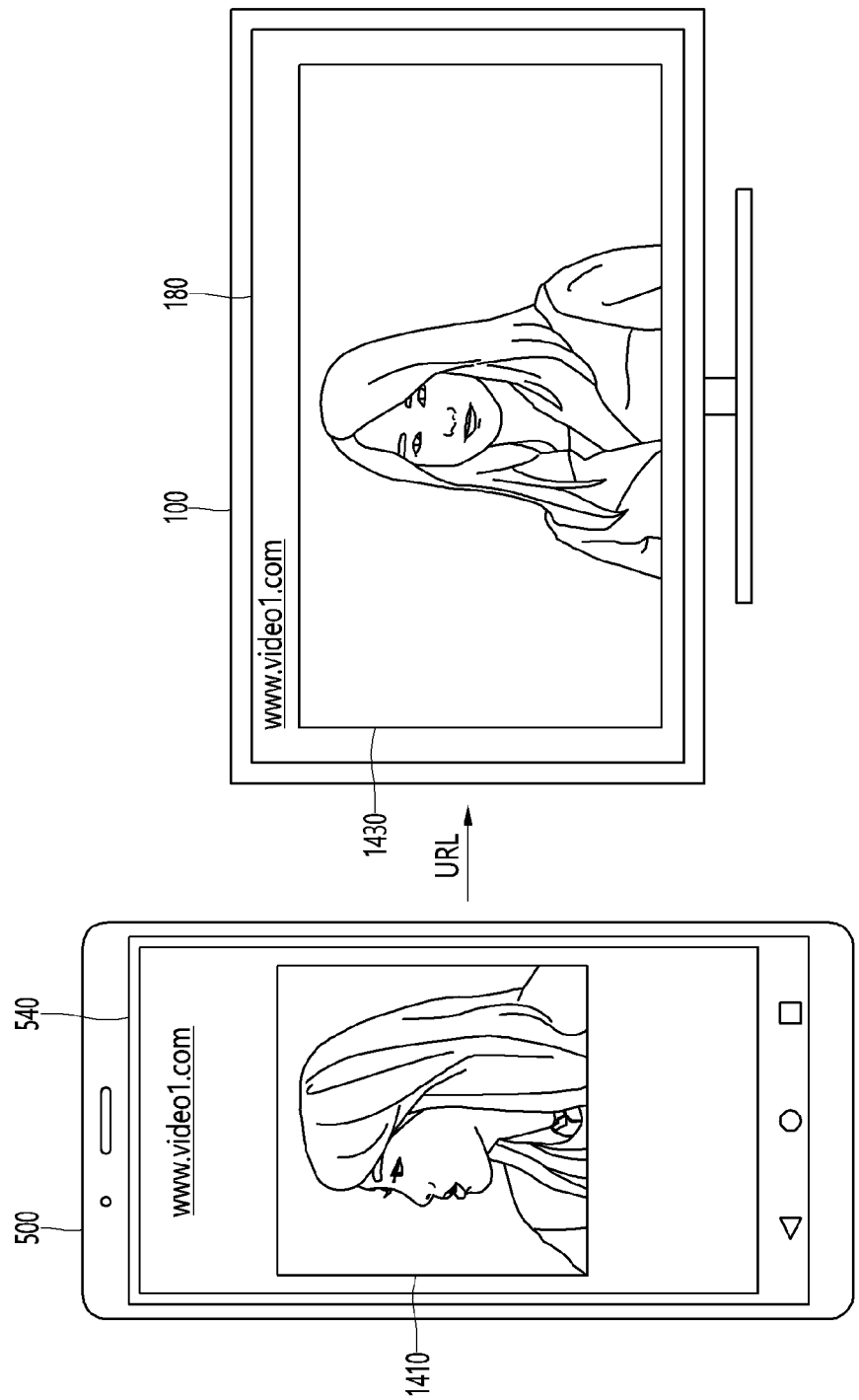

<1st tagging>

FIG. 15C
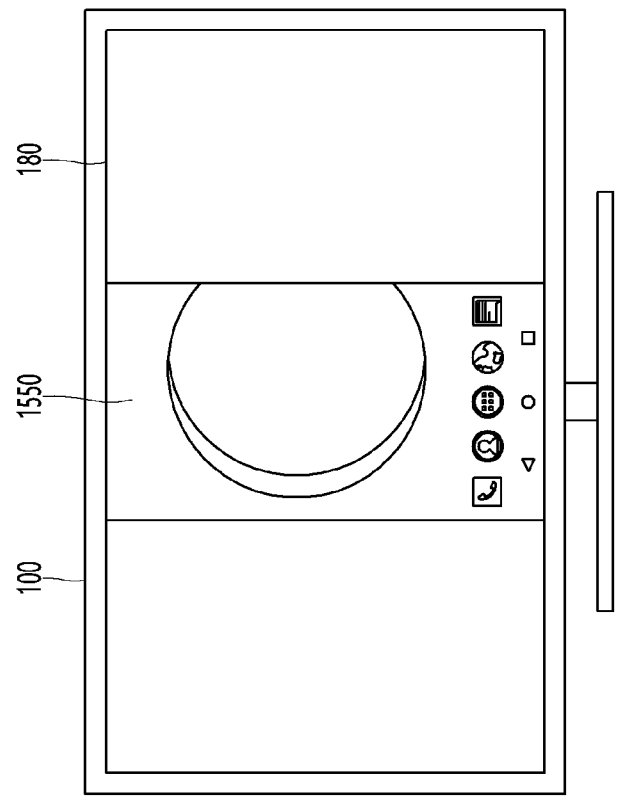
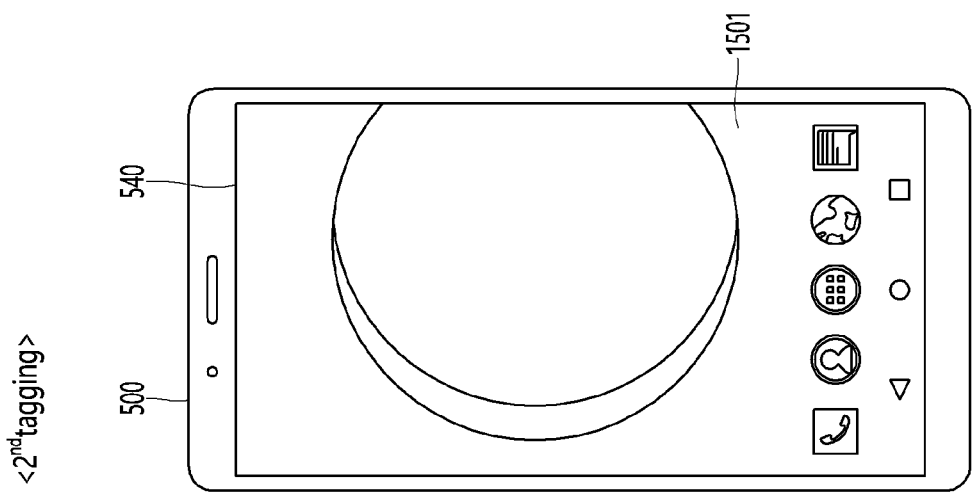

FIG. 16A
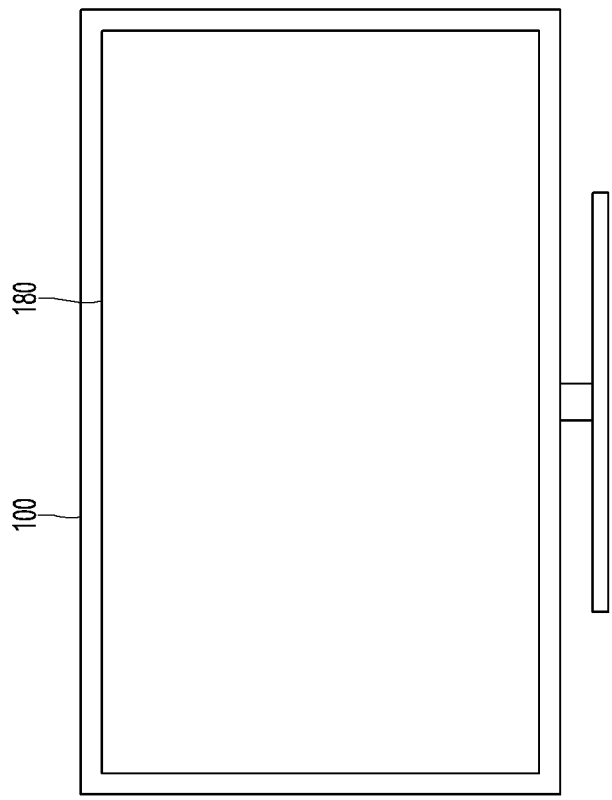
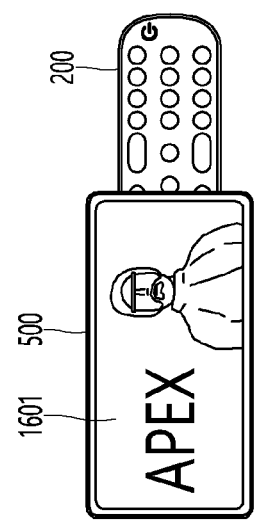

FIG. 17A
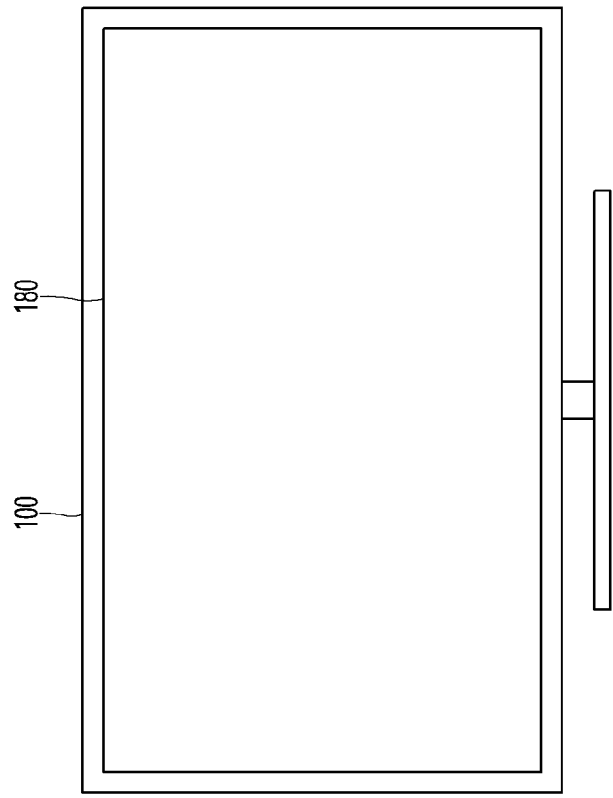
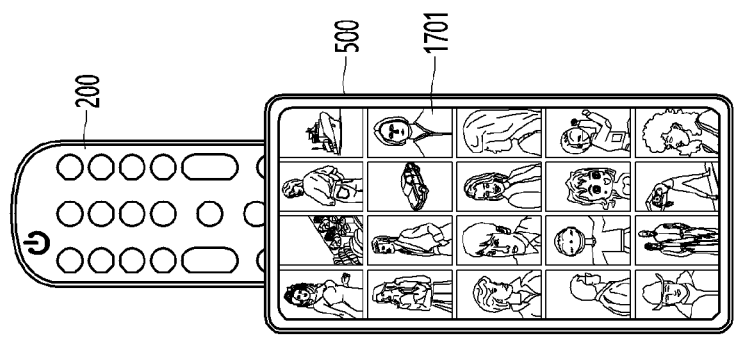

FIG. 17B
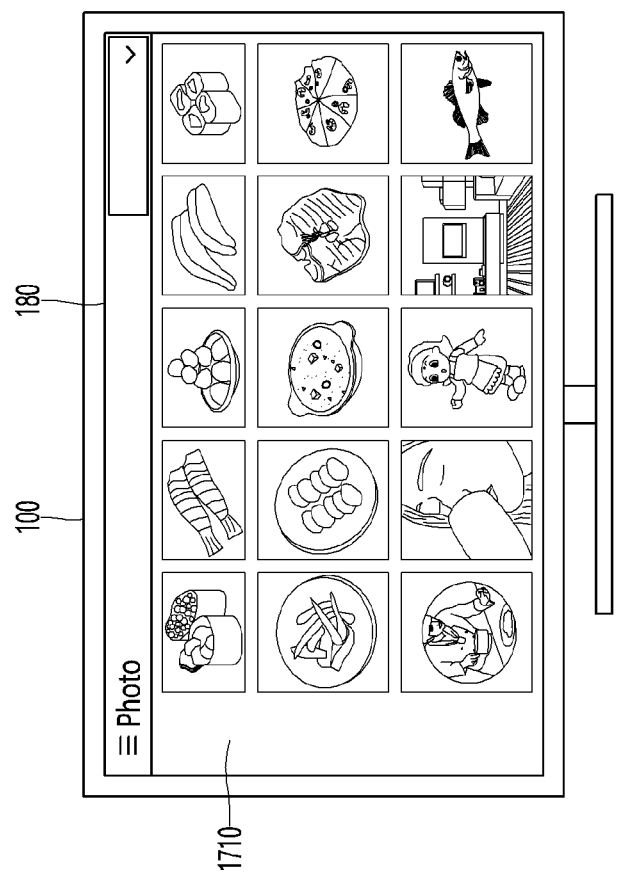
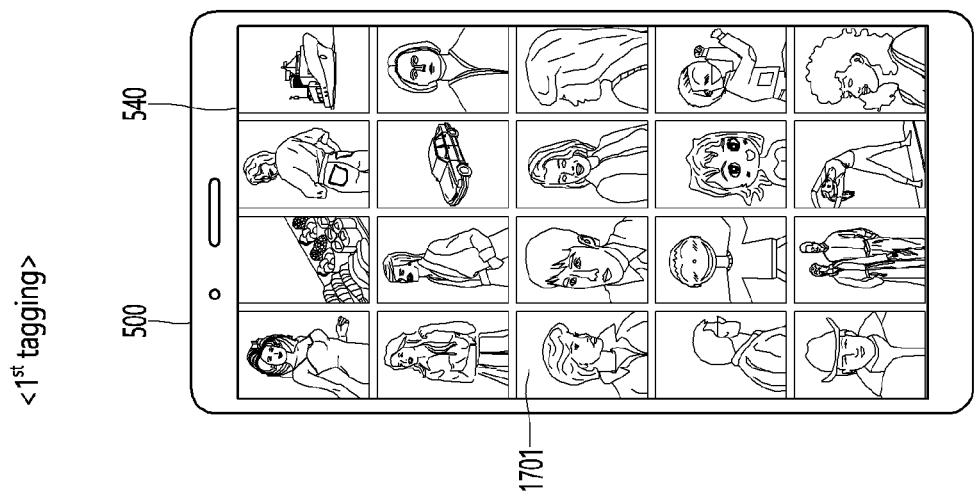
<1st tagging>

MOBILE TERMINAL AND DISPLAY SYSTEM

CROSS-REFERENCE TO RELATED APPLICATIONS

This application is the National Stage filing under 35 U.S.C. 371 of International Application No. PCT/KR2021/000018, filed on Jan. 4, 2021, the contents of which are all incorporated by reference herein in their entireties.

TECHNICAL FIELD

The present invention relates to a mobile terminal and a display system.

BACKGROUND ART

A digital TV service using a wired or wireless communication network is becoming common. The digital TV service can provide various services that could not be provided in the existing analog broadcasting service.

For example, IPTV (Internet Protocol Television), a type of digital TV service, and smart TV service provide bi-directionality that allows users to actively select the type of program to watch and the viewing time. IPTV and smart TV services may provide various additional services, such as Internet search, home shopping, and online games, based on this interactive nature.

That is, recent TVs are provided with a function for interaction between a smart phone and a TV through Near Field Communication (NFC) tagging.

However, functions according to NFC tagging are limited to some functions designated by manufacturers.

In addition, since data that can be stored in the NFC tag is very limited, there is a problem in that various function settings are not possible.

DISCLOSURE

Technical Problem

An object of the present disclosure is to provide various functions between a smart phone and a display device through NFC tagging.

An object of the present disclosure is to define an operation through tagging without storing data in an NFC tag.

Technical Solution

A mobile terminal according to an embodiment of the present disclosure may comprise a NFC module configured to transmit a Near Field Communication (NFC) tagging signal to a remote control device and receive wireless connection information in response to the tagging signal, a Wi-Fi module configured to perform a Wi-Fi connection with a display device using the wireless connection information, and a processor configured to transmit an action request for interworking with the mobile terminal to the display device if the mobile terminal is connected to the display device via Wi-Fi.

According to an embodiment of the present disclosure a display system including a display device, a remote control device and a mobile terminal, wherein the display device transmits wireless connection information to the remote control device, the mobile terminal transmits an NFC tagging signal to the remote control device, and receives the wireless connection information from the remote control device in response to the NFC tagging signal, performs a wireless connection with the display device based on the received wireless connection information, transmits an action request for an interworking function to the display device as the wireless connection is performed.

Advantageous Effects

According to various embodiments of the present disclosure, a user can set an NFC tagging operation with a simple manipulation while watching TV.

In addition, application or channel frequently used by the user can be directly executed by tagging operation.

In addition, any interlocking operation can be defined using the DB of the display device without storing additional data in the NFC tag.

In addition, the user may store a plurality of actions in the DB of the display device and select a function to be executed in the mobile terminal.

In addition, various functions can be additionally defined for each application as well as application execution through NFC interworking function setting.

DESCRIPTION OF DRAWINGS

FIGS. 14A and 14B are diagrams for explaining an example of sharing a URL between a mobile terminal and a display device according to an NFC interworking function.

FIGS. 15A to 15C are diagrams for explaining that an interworking function between a mobile terminal and a display device varies based on the number of times of NFC tagging according to an embodiment of the present disclosure.

FIGS. 16A to 17B are diagrams illustrating an NFC interworking function between a mobile terminal and a display device according to another embodiment of the present disclosure.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
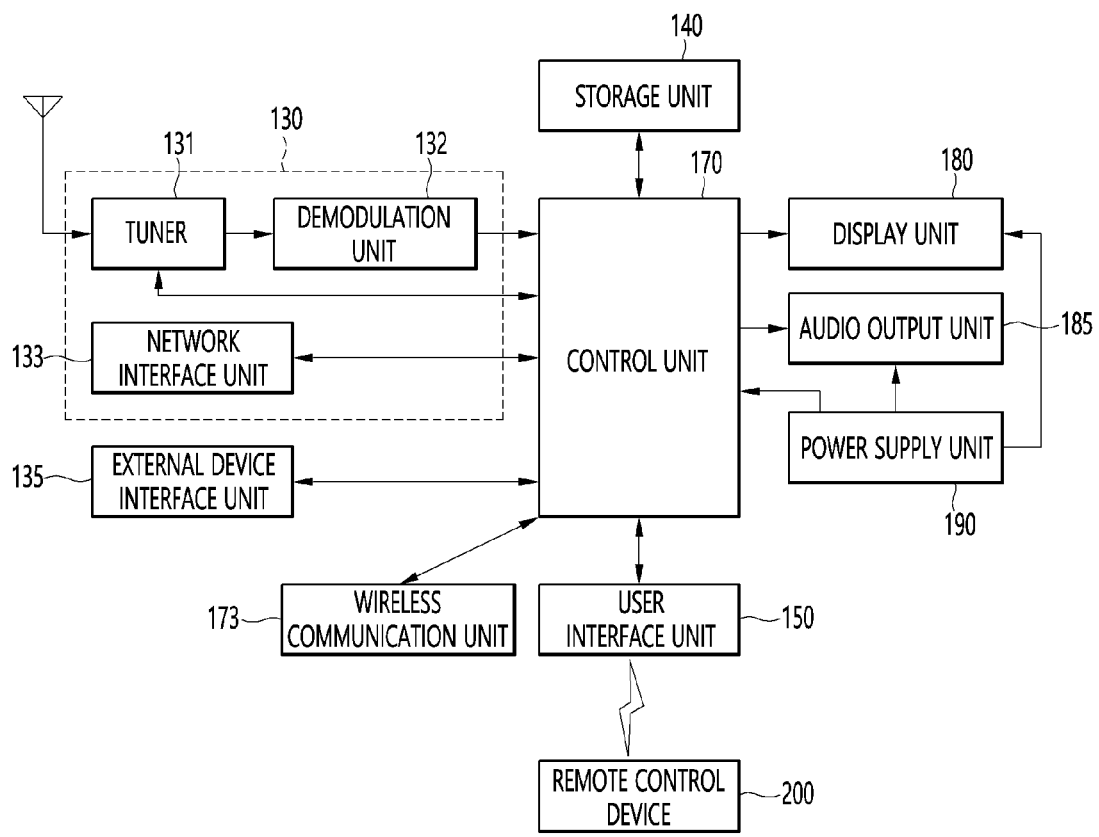
FIG. 1 is a block diagram illustrating a configuration of a display device according to an embodiment of the present disclosure.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or interworking) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
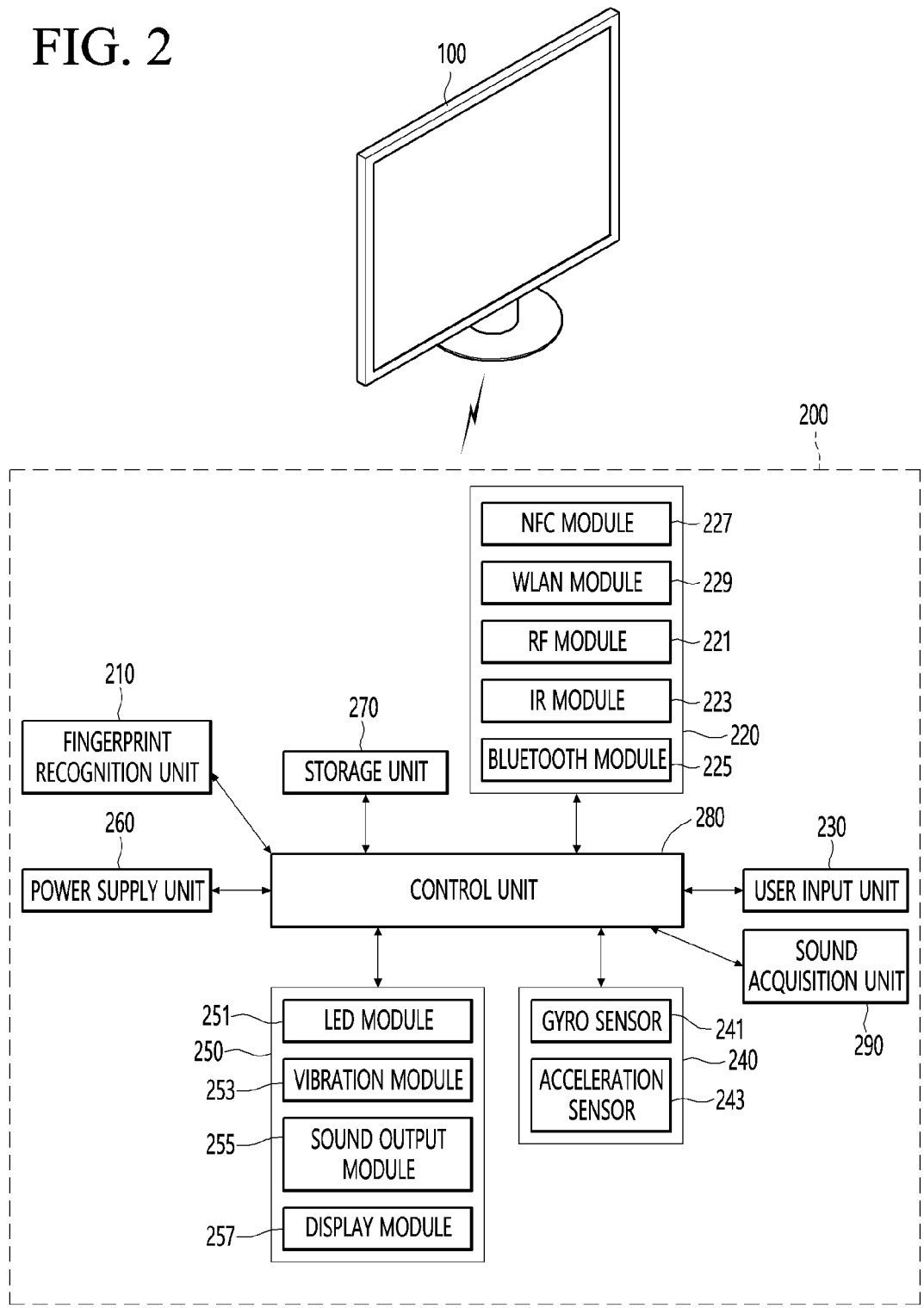
FIG. 2 is a block diagram illustrating a remote control device according to an embodiment of the present invention.
Figure 3:
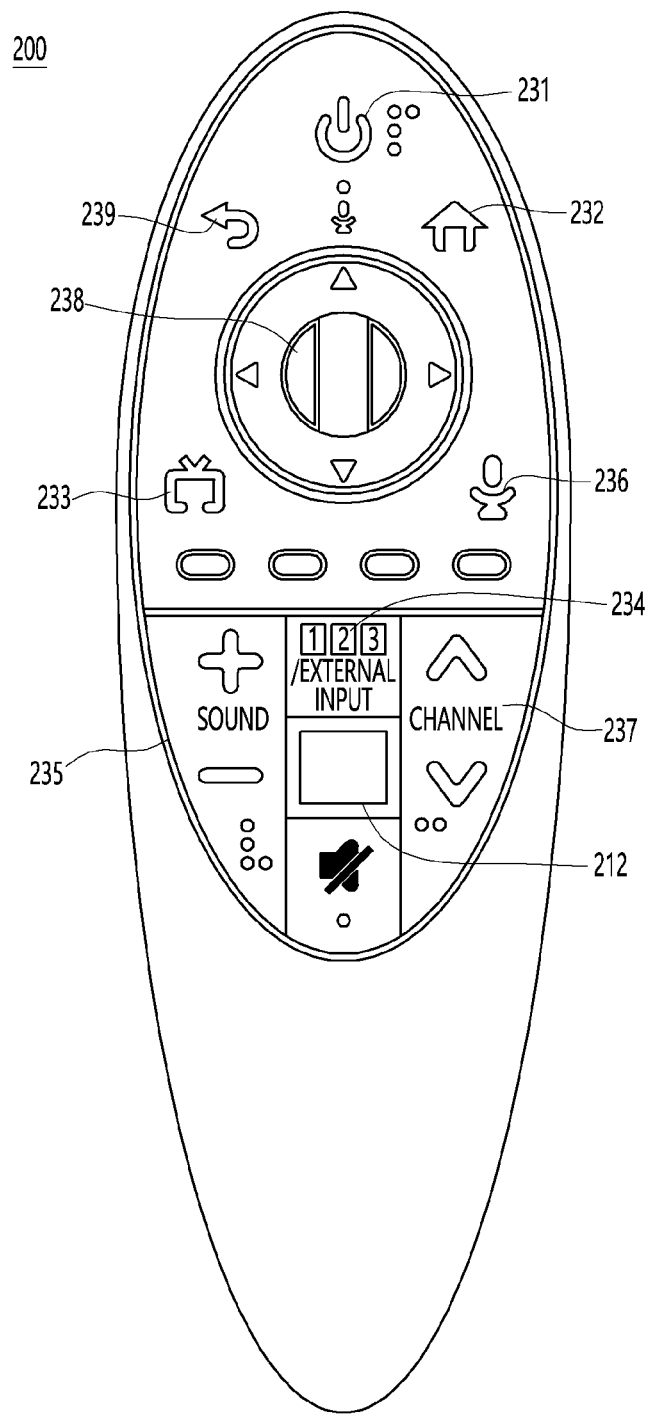
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
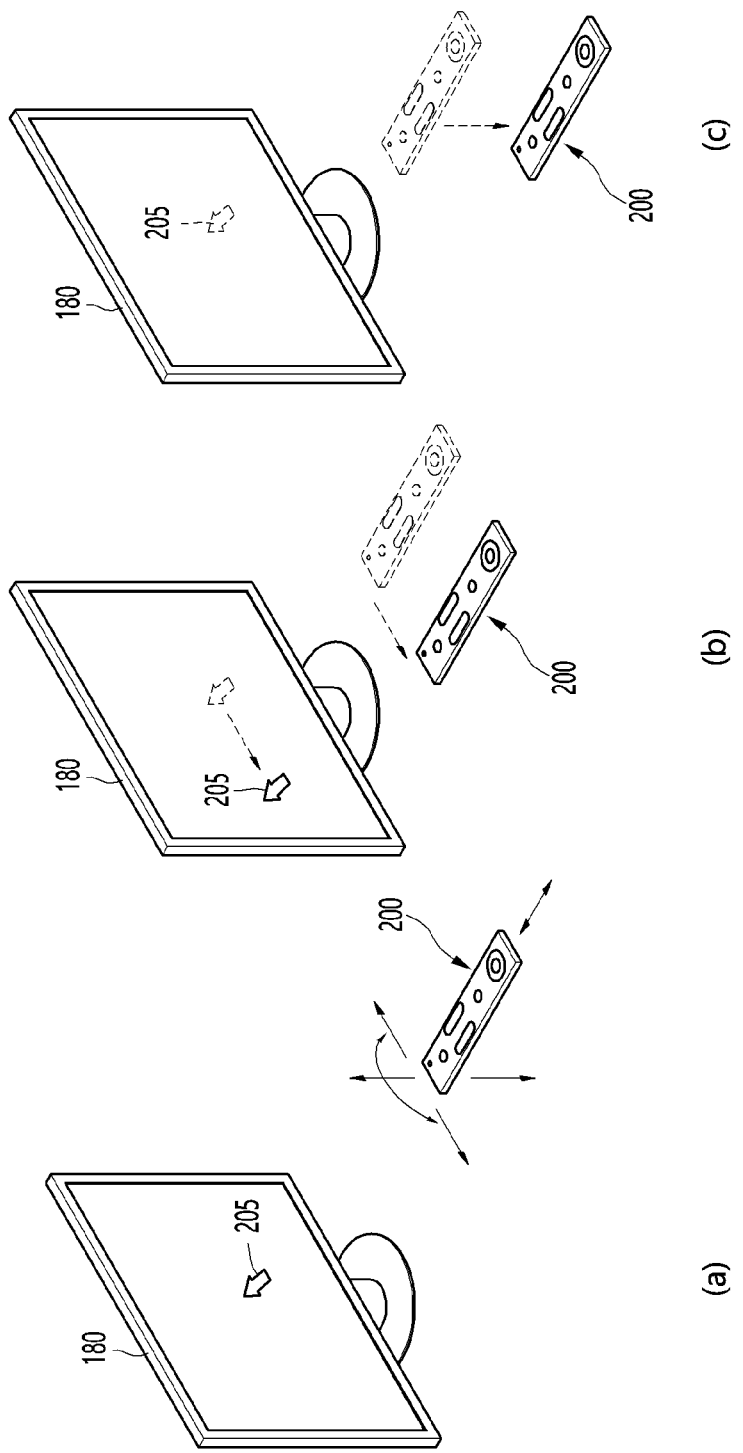
FIG. 4 is a view of utilizing a remote control device according to an embodiment of the present invention.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
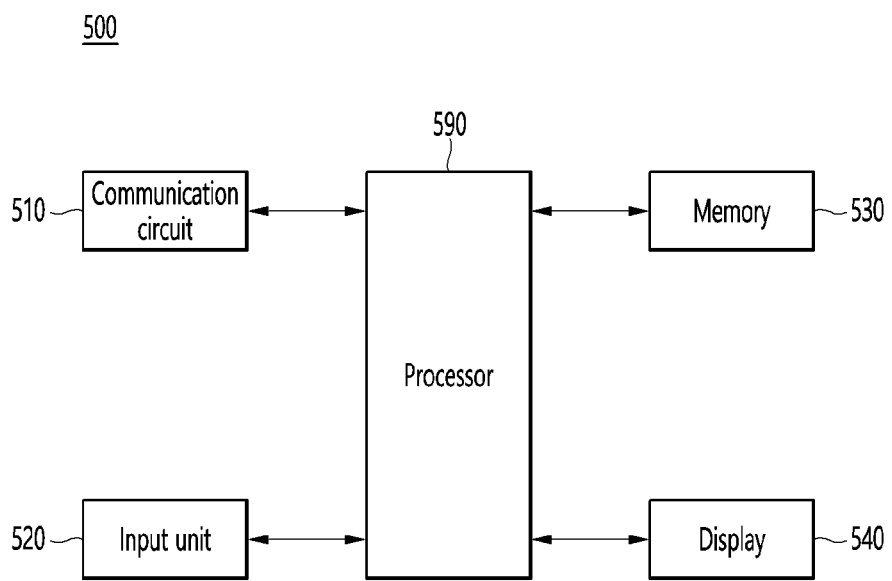
FIG. 5 is a diagram explaining the configuration of a wireless system according to an embodiment of the present invention.

FIG. 5 is a block diagram illustrating the configuration of a mobile terminal according to an embodiment of the present invention.

The mobile terminal 500 includes a projector, a mobile phone, a smart phone, a desktop computer, a laptop computer, a digital broadcast terminal, a personal digital assistant (PDA), a portable multimedia player (PMP), a navigation device, a tablet PC, a wearable device, a set-top box (STB), It may be implemented as a fixed device or a movable device such as a DMB receiver, a radio, or a desktop computer.

Referring to FIG. 5, a mobile terminal 500 may include a communication circuit 510, an input unit 520, a memory 530, a display 540, and a processor 590.

The communication circuit 510 may transmit/receive data with external devices such as other mobile terminals or servers using wired/wireless communication technology.

The communication circuit 510 may perform communication using any one of communication standards among GSM (Global System for Mobile communication), CDMA (Code Division Multi Access), LTE (Long Term Evolution), 5G, WLAN (Wireless LAN), Wi-Fi (Wireless-Fidelity), Bluetooth, Radio Frequency Identification (RFID), Infrared Data Association (IrDA), ZigBee, and Near Field Communication (NFC).

The input unit 520 may include a camera for inputting a video signal, a microphone for receiving an audio signal, and a user input unit for receiving information from a user.

Here, a camera or microphone may be treated as a sensor, and signal obtained from the camera or microphone may be referred to as sensing data or sensor information.

The memory 530 may store various software and data related to the operation of the mobile terminal 100.

The display 540 may display an image signal received from the outside.

The processor 590 may control overall operations of the mobile terminal 100.

The processor 590 may generate a control signal for controlling the external device and transmit the generated control signal to the external device if an external device needs to be linked to perform the operation of the mobile terminal 100.

The processor 590 may obtain intention information for a user input and determine a user's requirement based on the obtained intention information.

The processor 590 may control at least some of the components of the mobile terminal 100 to drive an application program stored in the memory 530.

The processor 590 may combine and operate two or more of the components included in the mobile terminal 100 to drive the application program.

Next, referring to FIG. 6, a method of operating a system according to an embodiment of the present invention will be described.

Figure 6:
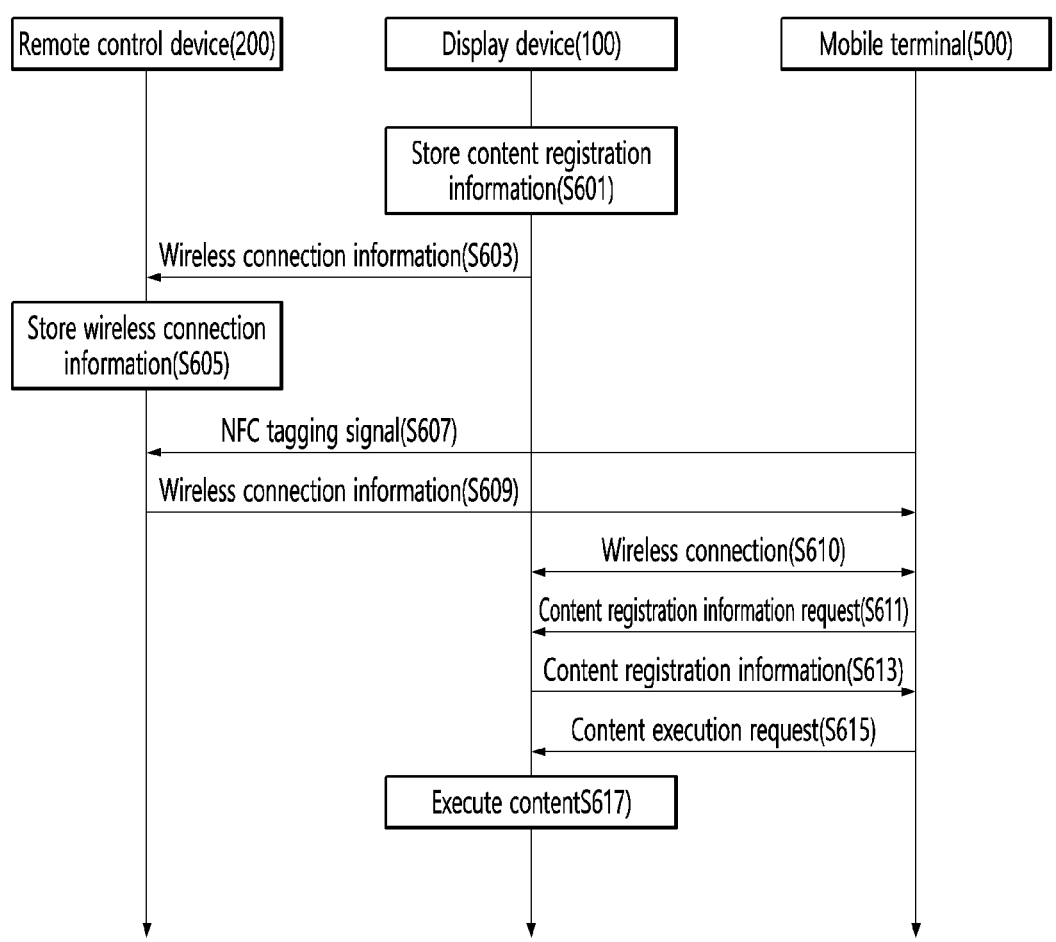
FIG. 6 is a block diagram illustrating the configuration of a mobile terminal according to an embodiment of the present invention.

FIG. 6 is a flowchart illustrating an operation method of a display system according to an embodiment of the present invention.

The display system may include a display device 100, a remote control device 200 and a mobile terminal 500.

Referring to FIG. 6, the control unit 170 of the display device 100 stores content registration information in the storage unit 140 (S601).

In one embodiment, content registration information may include information about content to be executed through NFC tagging.

A user may register one or more contents through manual setting.

Content may include application installed in the display device 100, channel (or channel number), video, image, web page, and setting item of the display device 100.

The setting item of the display device 100 may include one or more of brightness, sound, and Bluetooth connection.

A plurality of content registration information may correspond to each of the plurality of mobile terminals. That is, one mobile terminal can be matched with one content registration information.

If a plurality of mobile terminals exist in the home, content registration information may be stored to be matched to each mobile terminal. To this end, the content registration information may further include identification information for identifying the mobile terminal 500.

Figure 7:
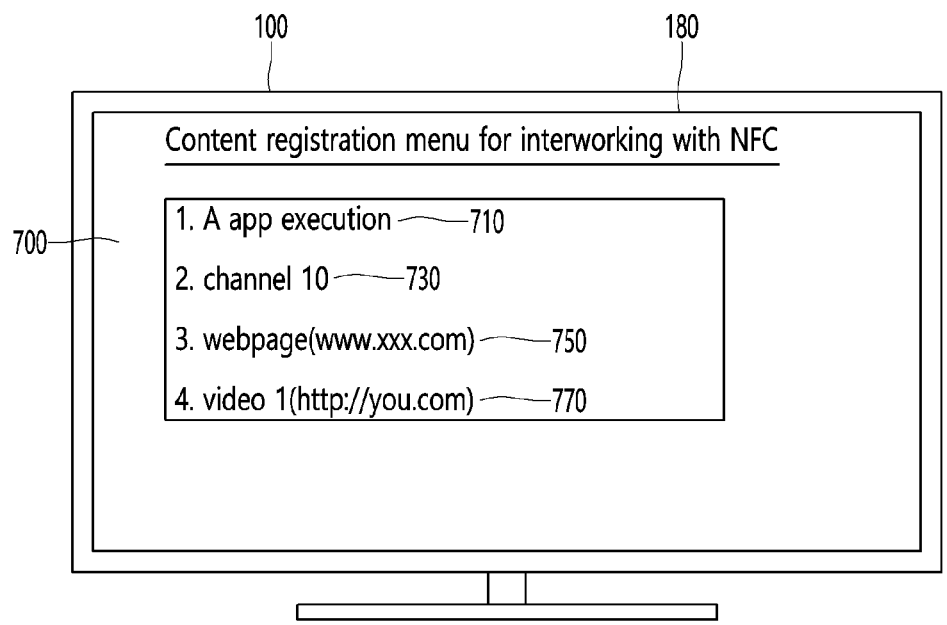
FIG. 7 is a ladder diagram for a method of operating a system according to an embodiment of the present invention.

FIG. 7 is a diagram illustrating a content registration process according to an embodiment of the present disclosure.

Referring to FIG. 7, the display device 100 may display a content registration menu 700 for interworking with NFC on the display unit 180.

The display device 100 may display the content registration menu 700 through a user's voice command.

As another example, the display device 100 may display the content registration menu 700 according to a request received from the remote control device 200.

The content registration menu 700 may include a plurality of content items 710 to 770. For example, the first content item 710 is an item corresponding to an application, the second content item 730 is an item corresponding to a broadcasting channel, and the third content item 750 is an item corresponding to a web page and the fourth content item 770 may be a video item.

The display device 100 may register each of the first to fourth content items 710 to 770 according to a user input.

The display device 100 may store information about each content item in the storage unit 140.

The first content item 710 is an application item, and information about the content item may include an application ID and application parameter.

The application parameter may be a parameter indicating information for reproducing specific content if the application is executed. For example, the application parameter may be a parameter for playing specific content in a video or content provider application, a specific website movement through a web application, or a parameter representing specific music reproduction in a music application.

The second content item 730 is a video item, and information about the content item may include a video ID and source information providing the video. Source information may include external device or website information.

The third content item 750 is a channel item, and information on the content item may include a channel name and a channel number.

The fourth content item 770 is a web page item, and information on the content item may include the address (URL) of the web page.

In this way, the user may register a plurality of contents for NFC interworking through the content registration menu 700. Registered information may be stored in the storage unit 140.

Again, FIG. 6 will be described.

Then, the control unit 170 of the display device 100 transmits wireless connection information to the remote control device 200 (S603).

In one embodiment, the wireless connection information may include a Wi-Fi address if the communication standard used is the Wi-Fi standard. The Wi-Fi address may be an address used for Wi-Fi connection between two devices.

The remote control device 200 stores the wireless connection information received from the display device 100 (S605).

Thereafter, the remote control device 200 receives a Near Field Communication (NFC) tagging signal from the mobile terminal 500 (S607), and transmits the stored wireless connection information to the mobile terminal 500 in response to the received NFC tagging signal (S609).

The NFC tagging signal may be a signal for requesting information stored in the NFC module 227 provided in the remote control device 200.

Information stored in the NFC module 227 may include wireless connection information received from the display device 100. The wireless connection information may include a Wi-Fi access address.

A user may perform an NFC tagging operation by bringing the mobile terminal 500 to the remote control device 200. According to the user's NFC tagging operation, the mobile terminal 500 may transmit an NFC tagging signal to the remote control device 200.

In another embodiment, the user may take an action of tagging the mobile terminal 500 to the display device 100. In this case, the display device 100 may include an NFC module for NFC communication with the mobile terminal 500.

The remote control device 200 may transmit wireless connection information stored in the NFC module 227 to the mobile terminal 500 in response to the NFC tagging signal of the mobile terminal 500.

The wireless connection information can be used for the mobile terminal 500 to automatically establish a wireless connection with the display device 100.

The mobile terminal 500 may automatically establish a wireless connection with the display device 100 based on the wireless connection information received from the remote control device 200.

For example, the mobile terminal 500 may be connected to the display device 100 through the Wi-Fi standard using a Wi-Fi access address.

The processor 590 of the mobile terminal 500 wirelessly connects to the display device 100 using the received wireless connection information (S610).

The control unit 170 of the display device 100 receives the content registration information request received from the mobile terminal 500 (S611) and transmits the content registration information to the mobile terminal 500 according to the received content registration information request (S613).

If a wireless connection with the mobile terminal 500 is established, the control unit 170 may receive a request for content registration information from the mobile terminal 500.

In one embodiment, the mobile terminal 500 may automatically transmit a content registration information request to the display device 100 after establishing a wireless connection with the display device 100.

In another embodiment, the mobile terminal 500 may transmit a content registration information request to the display device 100 through an application installed in the mobile terminal 500.

Here, the application installed in the mobile terminal 500 may be an application capable of controlling home appliance in the home through wireless communication.

The control unit 170 of the display device 100 may transmit the content registration information stored in the storage unit 140 to the mobile terminal 500 in response to the content registration information request received from the mobile terminal 500.

The control unit 170 of the display device 100 may transmit content registration information to the mobile terminal 500 through a Wi-Fi module included in the wireless communication unit 173.

The processor 590 of the mobile terminal 500 transmits a content execution request requesting execution of any one of a plurality of contents to the display device 100 based on the content registration information received from the display device 100 (S615).

The processor 590 of the mobile terminal 500 may receive a request for selecting one of a plurality of contents included in the content registration information and transmit a request for execution of the selected content to the display device 100.

Execution of the content may mean any one of content display, reproduction, tuning, and connection.

The control unit 170 of the display device 100 executes the corresponding content according to the content execution request received from the mobile terminal 500 (S617).

Figure 8A:
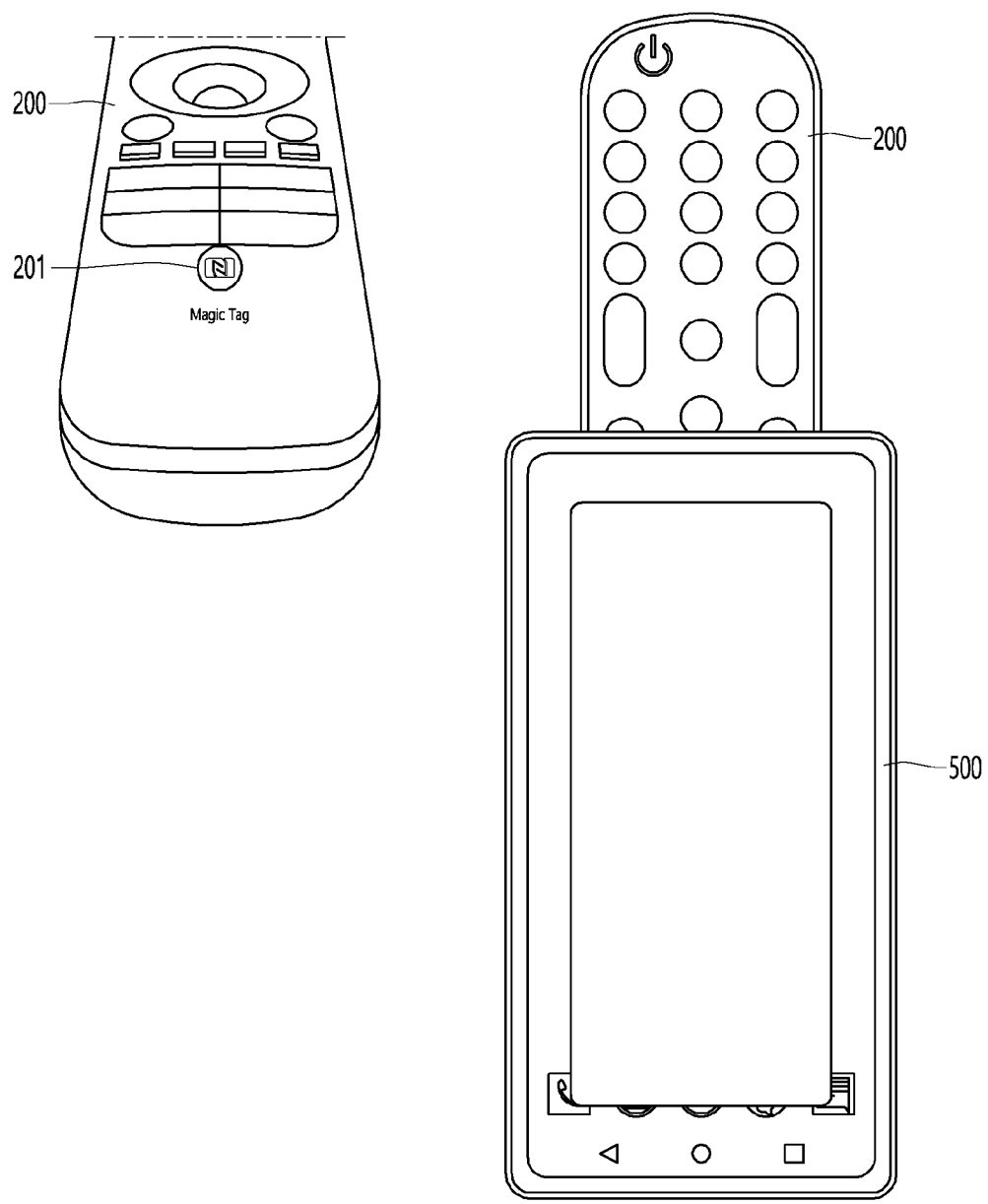
FIGS. 8A and 8B are diagrams illustrating an example of providing content registration information as a mobile terminal is tagged with a remote control device according to an embodiment of the present disclosure.
Figure 8B:
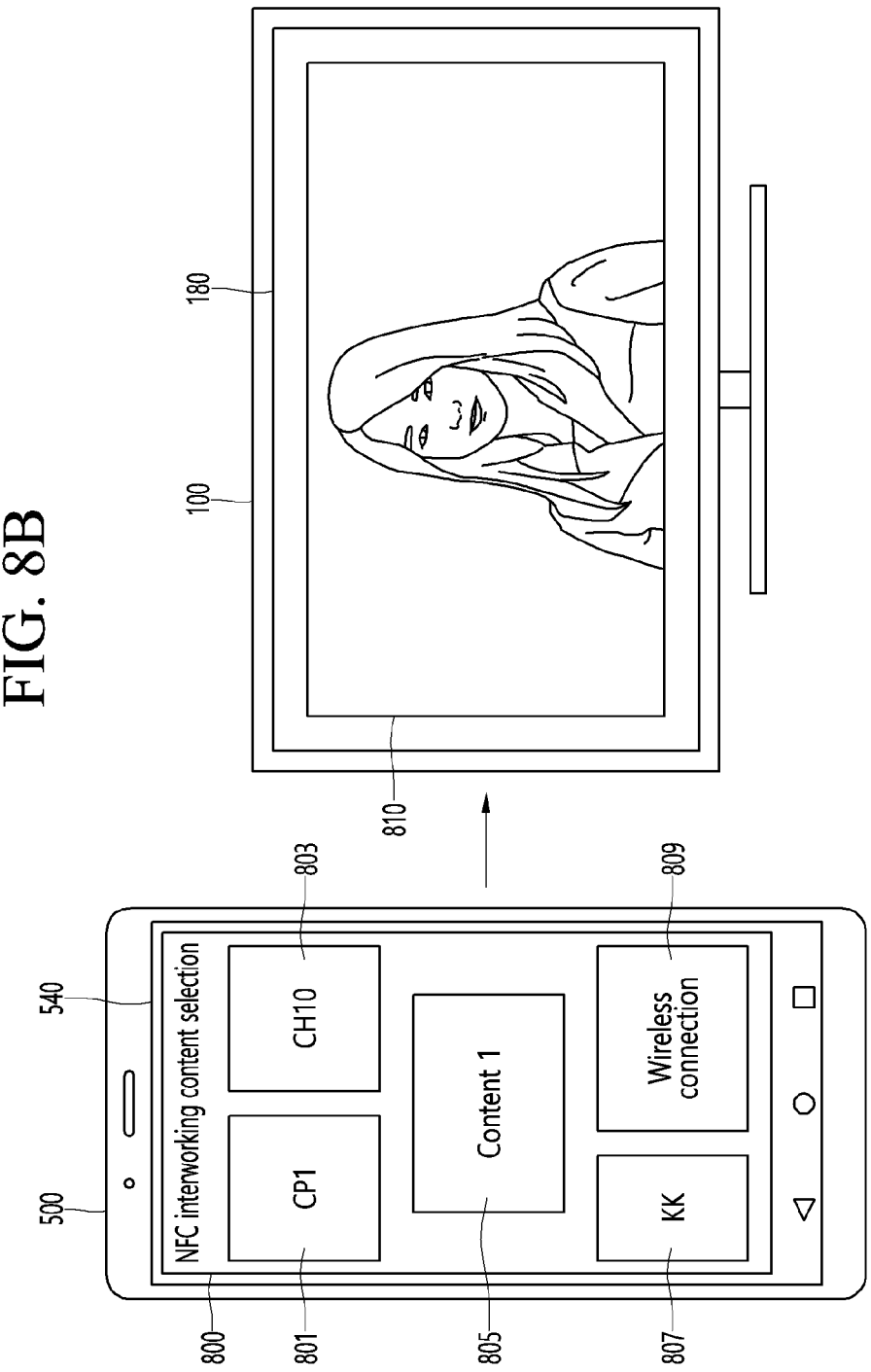

FIGS. 8A and 8B are diagrams illustrating an example of providing content registration information as a mobile terminal is tagged with a remote control device according to an embodiment of the present disclosure.

Referring to FIG. 8A, the remote control device 200 may include an NFC tag mark 201. The NFC tag mark 201 may indicate a location for guiding the user's NFC tagging location. An NFC module may be embedded at the bottom of the NFC tag mark 201.

The user can bring the back of the mobile terminal 500 to the NFC tag mark 201. Accordingly, the mobile terminal 500 may receive the Wi-Fi address through the NFC module of the remote control device 200.

The mobile terminal 500 may perform a Wi-Fi connection with the display device 100 using the Wi-Fi address.

The mobile terminal 500 may request content registration information from the display device 100 after being connected to the display device 100 through Wi-Fi.

As shown in FIG. 8B, the mobile terminal 500 may display the content registration information 800 received from the display device 100 on the display 540.

The content registration information 800 may include a plurality of content items 801 to 809.

Each of the plurality of content items 801 to 809 may be an item previously stored in the display device 100 in step S601 of FIG. 6.

The first content item 801 may be an item (application) representing a content provider.

The second content item 803 may be an item representing a channel.

The third content item 805 may be an item (thumbnail) representing a video playable through a video playback service.

The fourth content item 807 may be an item representing an Internet application accessible to a web site.

The fifth content item 809 may be an item for setting up a wireless connection.

In addition, the content item may be a setting item capable of controlling output brightness of the display unit 180, sound of the display device 100, and the like.

When receiving a request for selecting the third content item 805, the mobile terminal 500 may transmit it to the display device 100.

The display device 100 may reproduce the content video 810 corresponding to the third content item 805 on the display unit 180 according to the request received from the mobile terminal 500.

The display device 100 may reproduce the content image 810 using a content ID corresponding to the third content item 805 and source information providing the content.

As described above, according to an embodiment of the present disclosure, the user can easily access the function of the display device 100 by simply tagging the mobile terminal 500 to the remote control device 200.

Figure 9:
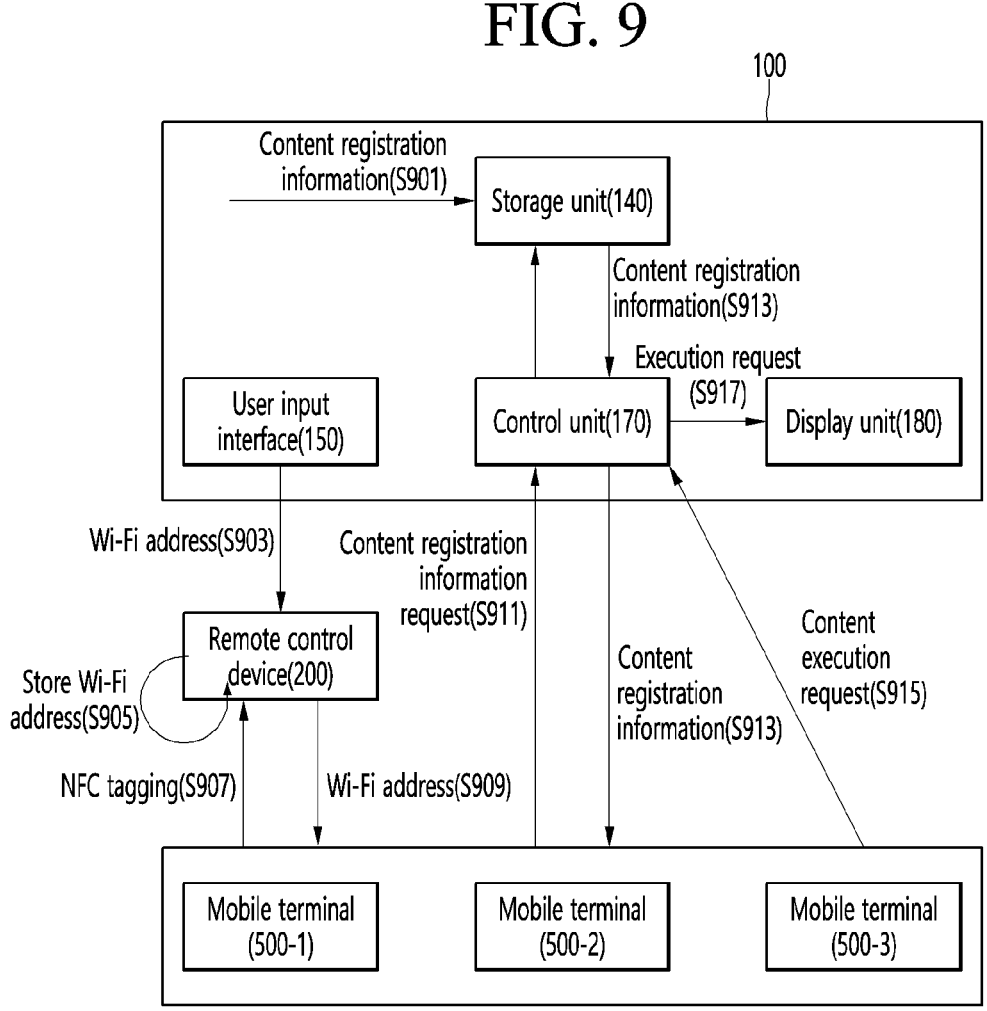
FIG. 9 is a diagram illustrating a process of setting and executing an NFC dynamic action according to an embodiment of the present disclosure.

FIG. 9 is a diagram illustrating a process of setting and executing an NFC dynamic action according to an embodiment of the present disclosure.

The NFC dynamic action may represent an action for performing an NFC interlocking function with only an NFC tagging operation.

FIG. 9 is a diagram specifying the embodiment of FIG. 6.

The display device 100 may store a plurality of contents to be executed through NFC linkage according to a user input and content registration information including information of each content in the storage unit 140 (S901).

The remote control device 200 may receive the Wi-Fi address from the user input interface unit 150 of the display device 100 (S903). The remote control device 200 and the display device 100 may communicate through a Bluetooth communication standard.

To this end, each of the user input interface unit 150 and the remote control device 200 may include a Bluetooth communication circuit.

The remote control device 200 may store the Wi-Fi address received from the display device 100 in the NFC module 227 (S905).

If one of the plurality of mobile terminals 500-1 to 500-3 (500-1) is tagged with the remote control device 200 (S907), the remote control device 200 may transmit a Wi-Fi address to the corresponding terminal (S909).

The mobile terminal 500-1 accesses the display device 100 using the Wi-Fi address and requests content registration information (S911).

The control unit 170 of the display device 100 may read content registration information from the storage unit 140 and transmit the read content registration information to the corresponding mobile terminal 500-1 (S913).

The mobile terminal 500-1 may transmit an execution request of any one of a plurality of contents included in the content registration information to the control unit 170 of the display device 100 (S915).

The control unit 170 of the display device 100 may request the display unit 180 to execute the corresponding content according to the content execution request received from the mobile terminal 500-1 (S917).

Figure 10:
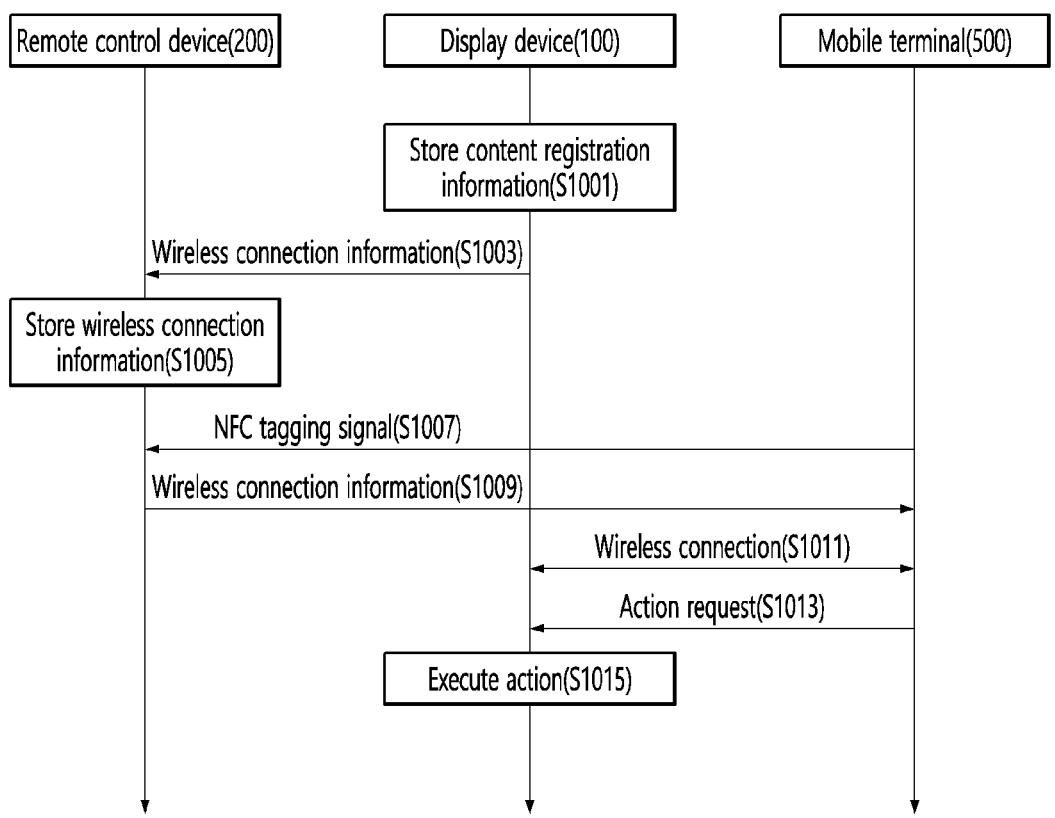
FIG. 10 is a flowchart illustrating a method of operating a display system according to another exemplary embodiment of the present disclosure.

FIG. 10 is a flowchart illustrating a method of operating a display system according to another exemplary embodiment of the present disclosure.

In FIG. 10, the detailed description of the same configuration as that of FIG. 6 is replaced with the description of FIG. 6.

Referring to FIG. 6, the control unit 170 of the display device 100 stores content registration information in the storage unit 140 (S1001).

Then, the control unit 170 of the display device 100 transmits wireless connection information to the remote control device 200 (S1003).

In one embodiment, the wireless connection information may include a Wi-Fi address if the communication standard used is the Wi-Fi standard. The Wi-Fi address may be an address used for Wi-Fi connection between two devices.

The remote control device 200 stores the wireless connection information received from the display device 100 (S1005).

Thereafter, the remote control device 200 receives a Near Field Communication (NFC) tagging signal from the mobile terminal 500 (S1007), and transmits the stored wireless connection information to the mobile terminal 500 in response to the received NFC tagging signal (S1009).

The processor 590 of the mobile terminal 500 wirelessly connects to the display device 100 using the received wireless connection information (S1011).

Meanwhile, the processor 590 of the mobile terminal 500 transmits an action request to the display device 100 (S1013).

In one embodiment, the action request may be a mirroring request for viewing the screen of the mobile terminal 500 on the display device 100.

In another example, the action request may be a reverse mirroring request for viewing the screen of the display device 100 on the mobile terminal 500.

In another example, the action request may be a request for outputting audio output from the audio output unit 185 of the display device 100 to the mobile terminal 500.

In another example, the action request may be a request for viewing the content of the mobile terminal 500 on the display device 100.

In another example, the action request may be a request for the display device 100 to display a plurality of contents included in the content registration information of step S1001.

Actions may be added according to user setting.

The control unit 170 of the display device 100 performs an action in response to the action request received from the mobile terminal 500 (S1015).

Figure 11:
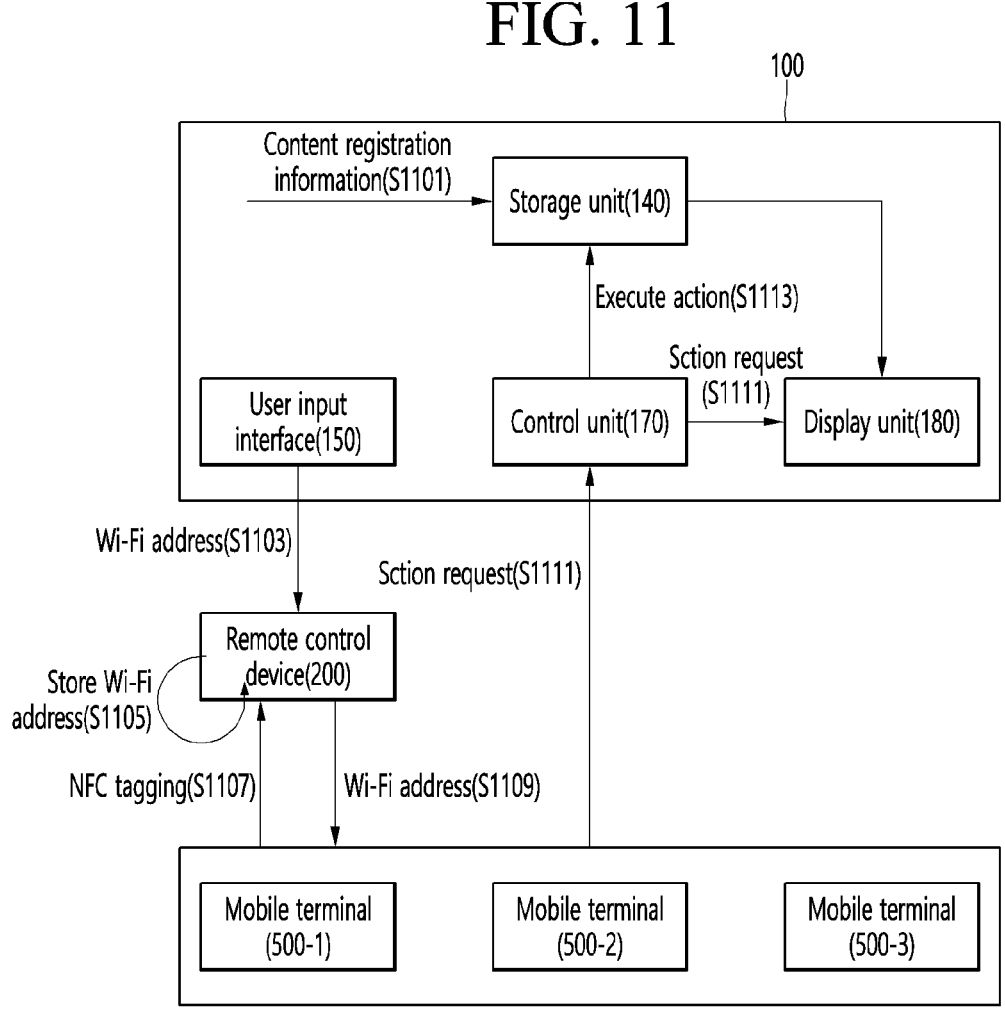
FIG. 11 is a diagram illustrating a process of setting and executing an NFC dynamic action according to another embodiment of the present disclosure.

FIG. 11 is a diagram illustrating a process of setting and executing an NFC dynamic action according to another embodiment of the present disclosure.

FIG. 11 is a diagram embodying the embodiment of FIG. 10.

The display device 100 may store a plurality of contents to be executed through NFC linkage according to a user input and content registration information including information of each content in the storage unit 140 (S1101).

The remote control device 200 may receive the Wi-Fi address from the user input interface unit 150 of the display device 100 (S1103). The remote control device 200 and the display device 100 may communicate through a Bluetooth communication standard.

To this end, each of the user input interface unit 150 and the remote control device 200 may include a Bluetooth communication circuit.

The remote control device 200 may store the Wi-Fi address received from the display device 100 in the NFC module 227 (S1105).

If one of the plurality of mobile terminals 500-1 to 500-3 (500-1) is tagged with the remote control device 200 (S907), the remote control device 200 may transmit a Wi-Fi address to the corresponding terminal (S1109).

The mobile terminal 500-1 may be connected to the display device 100 through Wi-Fi communication using a Wi-Fi address.

The mobile terminal 500-1 may transmit an action request to the display device 100 (S1111).

In one embodiment, the action request may be a request related to mirroring, audio output, and content reproduction.

In another embodiment, the action request may be a request to display a plurality of contents included in the content registration information on the display device 100 or the mobile terminal 500.

The control unit 170 may determine the type of action request and control the storage unit 140 or the display unit 180 according to the identified action request.

For example, if the type of action request is a first action request for device interworking between the display device 100 and the mobile terminal 500, the control unit 170 sends the display unit 180 or the audio output unit 185. Through this, it is possible to perform a device linkage function (S1111).

The device linkage function may be any one of a video mirroring function, an audio mirroring function, and a function of viewing content of the mobile terminal 500 through the display device 100.

If the type of action request is a second action request requesting content registration information stored in the display device 100, the control unit 170 may read the content registration information through the storage unit 140 (S1113). The control unit 170 may display a plurality of contents included in the read content registration information on the display unit 180.

Figure 12:
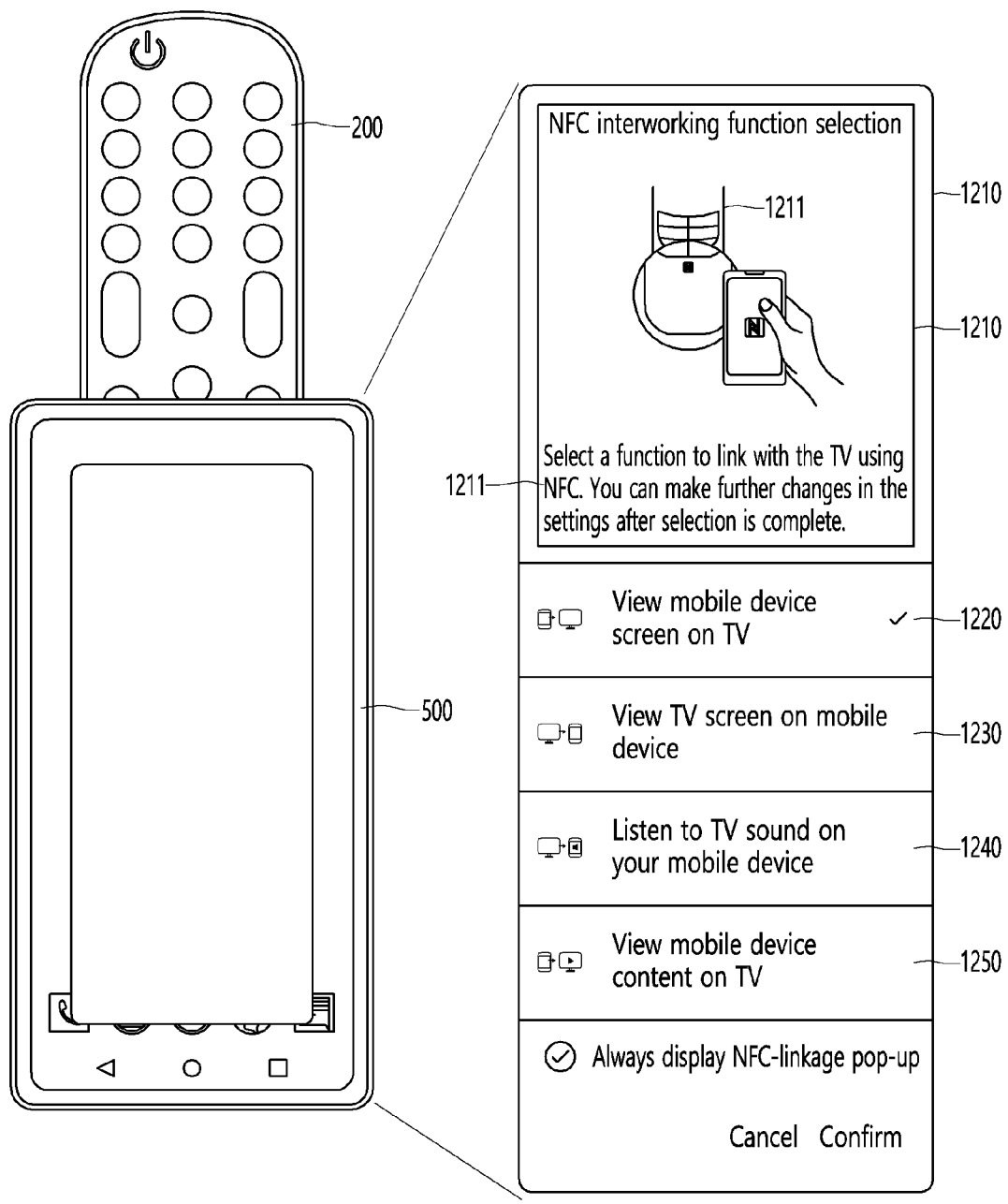
FIG. 12 is a diagram illustrating a screen displayed on a mobile terminal if the mobile terminal is tagged with a remote control device according to an embodiment of the present disclosure.

FIG. 12 is a diagram illustrating a screen displayed on a mobile terminal if the mobile terminal is tagged with a remote control device according to an embodiment of the present disclosure.

Referring to FIG. 12, if the user brings the mobile terminal 500 to the NFC tag mark 201 of the remote control device 200, the mobile terminal 500 may display a guide screen 1200 for an NFC interworking function.

The guide screen 1200 may be a screen for guiding interlocking functions between the mobile terminal 500 and the display device 100 using NFC.

The guide screen 1200 may include a guide item 1210, a mirroring item 1220, a reverse mirroring item 1230, an audio reverse mirroring item 1240, and a content playback item 1250.

The guide item 1210 may be an item describing an NFC interworking function. The guide item 1210 may include a guide image 1211 indicating a tagging operation between the mobile terminal and the remote control device and guide text 1213 indicating selection of an NFC interworking function.

The guide text 1213 may further include text guiding addition or change of the NFC interworking function.

The mirroring item 1220 may be an item for executing a mirroring function allowing viewing of the screen of the mobile terminal 500 on the display device 100.

If the mirroring item 1220 is selected, the mobile terminal 500 may transmit information about the screen being displayed to the display device 100. The display device 100 may display the same screen as the screen being displayed by the mobile terminal 500 based on the received screen information.

The reverse mirroring item 1230 may be an item for executing a function for viewing the screen of the display device 100 on the mobile terminal 500.

If the reverse mirroring item 1230 is selected, the mobile terminal 500 can request and receive information on the screen being displayed on the display device 100. The mobile terminal 500 may display the screen being displayed on the display device 100 based on the received screen information.

The audio reverse mirroring item 1240 may be an item for listening to audio output from the display device 100 in the mobile terminal 500. If the audio reverse mirroring item 1240 is selected, the mobile terminal 500 may request transmission of audio output from the display device 100 and receive the audio in response to the request.

The mobile terminal 500 may output the received audio.

The content playback item 1250 may be an item for viewing content stored in the mobile terminal 500 or content corresponding to a web address on the display device 100.

If the content playback item 1250 is selected, the mobile terminal 500 may request the display device 100 to play the content stored in the mobile terminal 500 or the content corresponding to the web address. To this end, the mobile terminal 500 may transmit one or more of content or content information (source information, URL information) to the display device 100.

The display device 100 may reproduce content based on content or content information received from the mobile terminal 500.

According to another embodiment, a user may add or change an NFC interworking function through the guide screen 1200.

For example, a user may add a function for transmitting a URL of a web page displayed by the mobile terminal 500 to the display device 100 or a function of requesting a URL of a web page displayed by the display device 100 to the guide screen 1200, or change with other item.

In this way, the user can easily access the function for interworking between the mobile terminal 500 and the display device 100 only by tagging the mobile terminal 500 to the remote control device 200.

Figure 13:
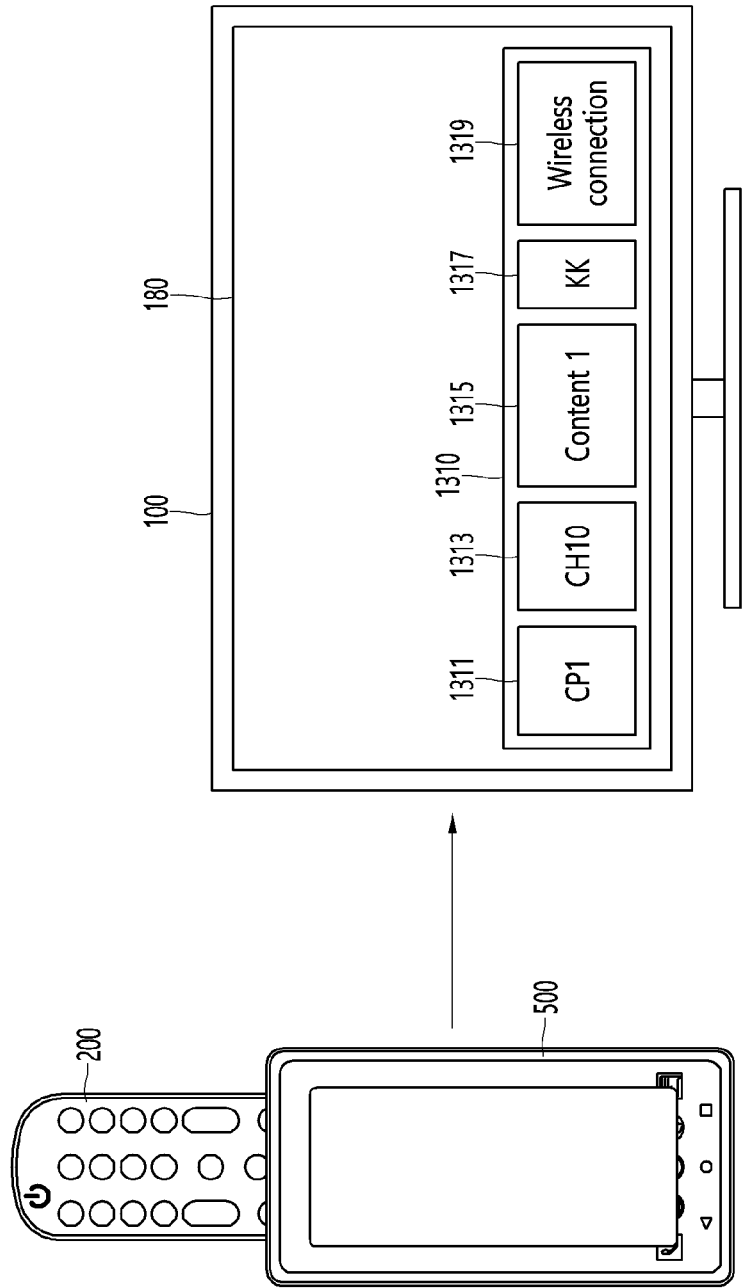
FIG. 13 is a diagram illustrating a screen displayed on a display device if a mobile terminal is tagged with a remote control device according to another embodiment of the present disclosure.

FIG. 13 is a diagram illustrating a screen displayed on a display device if a mobile terminal is tagged with a remote control device according to another embodiment of the present disclosure.

Referring to FIG. 13, if the user brings the mobile terminal 500 to the NFC tag mark 201 of the remote control device 200, the display device 100 read content registration information corresponding to the mobile terminal 500 and display the content list 1310 on the display unit 180.

The content list 1310 may include a plurality of content items 1311 to 1319 included in pre-registered content registration information.

The first content item 1311 may be an item (application) representing a content provider.

The second content item 1313 may be an item representing a channel.

The third content item 1315 may be an item (thumbnail) representing a video playable through a video playback service.

The fourth content item 1317 may be an item representing an Internet application accessible to a web site.

The fifth content item 1319 may be an item for setting up a wireless connection.

The fifth content item 1319 may be a setting item capable of controlling output brightness of the display unit 180, sound of the display device 100, and the like.

In this way, the user can quickly access content desired to be executed on the display device 100 only by tagging the mobile terminal 500 to the remote control device 200. Accordingly, user experience can be greatly improved.

That is, since data that can be stored in the NFC tag is limited, content registration information stored in the storage unit 140 of the display device 100 having a larger capacity can be utilized through the NFC function.

Figure 14B:
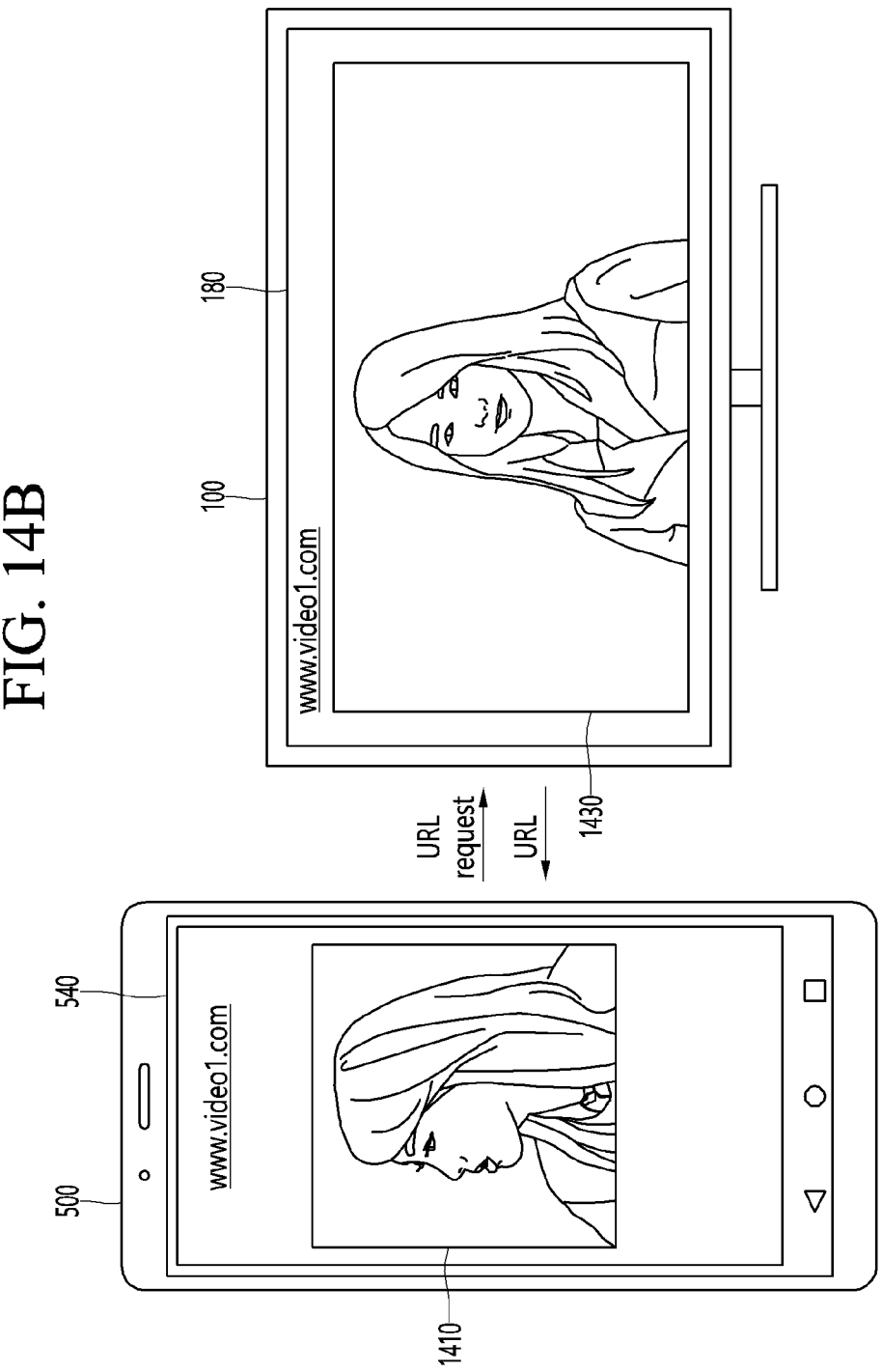

FIGS. 14A and 14B are diagrams for explaining an example of sharing a URL between a mobile terminal and a display device according to an NFC interworking function.

In FIGS. 14A and 14B, it is assumed that the user has performed a tagging operation of the mobile terminal 500 to the remote control device 200.

Also, the mobile terminal 500 displays the web page 1410 on the display 540 through the web browser before tagging.

The mobile terminal 500 may transmit the URL of the web page 1410 to the display device 100 after being connected to the display device 100 through Wi-Fi communication.

A function for the mobile terminal 500 to transmit a URL of a web page to the display device 100 may be set in advance.

That is, the user may set the function of transmitting the URL of the web page of the mobile terminal 500 to the display device 100 as an NFC linkage function in advance. This may be performed in step S601 of FIG. 6.

Referring to FIG. 14A, the mobile terminal 500 may tag the URL of the web page 1410 on the display 540 and transmit it to the display device 100 during tagging. The mobile terminal 500 may transmit a URL and a message requesting access to the URL to the display device 100 together.

The display device 100 may display the web page 1430 by accessing the URL received from the mobile terminal 500.

Referring to FIG. 14B, a user may set a function of transmitting a URL of a web page accessed and displayed by the display device 100 through a web browser to the mobile terminal 500 as an NFC interworking function in advance. This may be performed in step S601 of FIG. 6.

After tagging, the mobile terminal 500 may request the URL of the web page 1430 being displayed on the display device 100. The display device 100 may transmit a URL to the mobile terminal 500 according to a URL request.

The mobile terminal 500 may display the web page 1410 through a web browser using the received URL.

As such, according to an embodiment of the present disclosure, a web page can be easily shared between the display device 100 and the mobile terminal 500 only by setting a simple NFC-linked function.

Figure 15A:
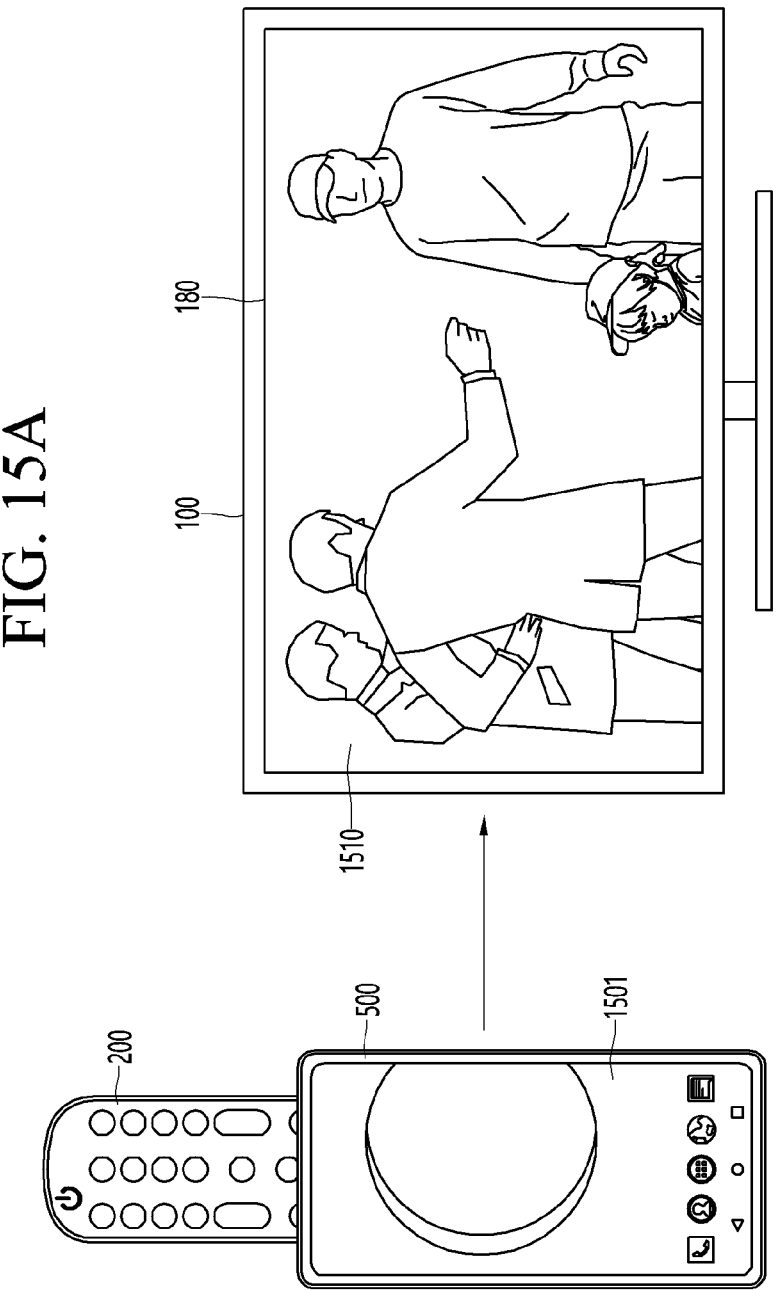
Figure 15B:
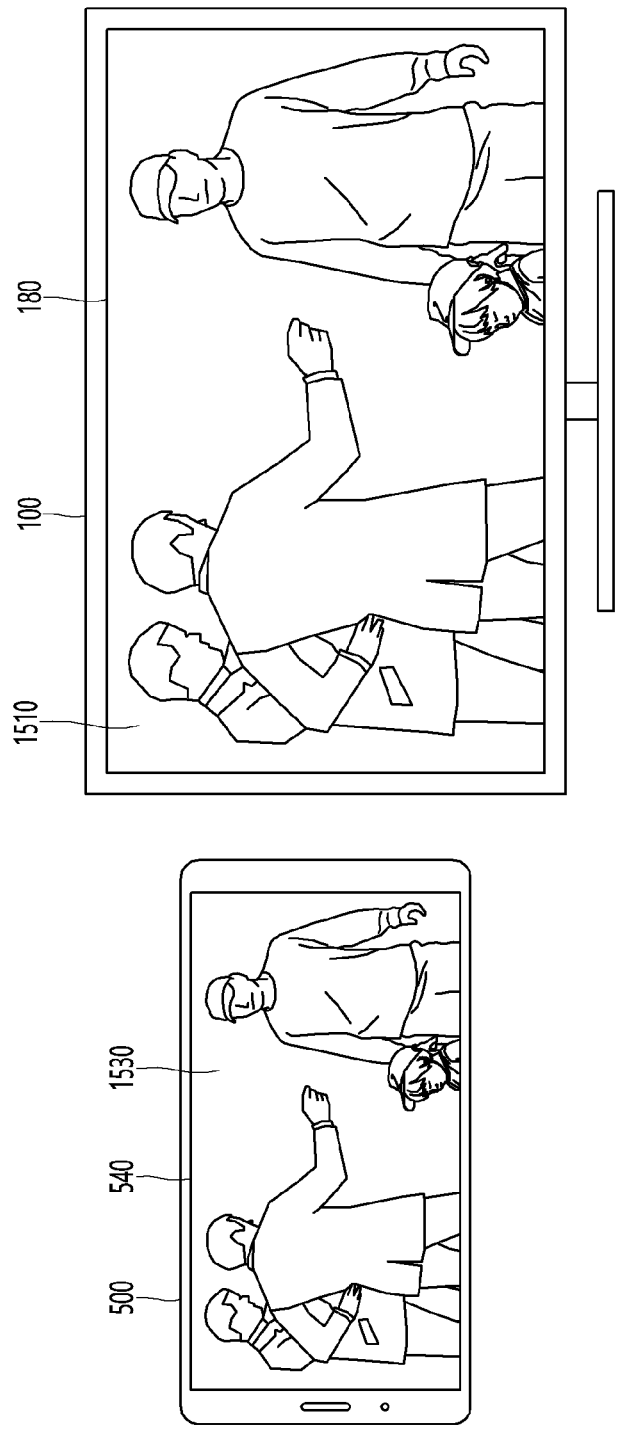

FIGS. 15A to 15C are diagrams for explaining that an interworking function between a mobile terminal and a display device varies based on the number of times of NFC tagging according to an embodiment of the present disclosure.

In FIGS. 15A to 15C, it is assumed that the user sets the reverse mirroring function through NFC tagging once and sets the mirroring function through NFC tagging twice.

The set information may be stored in the mobile terminal 500 or the display device 100.

Referring to FIG. 15A, the mobile terminal 500 displays a home screen 1501 and the display device 100 displays an image 1510. The image 1510 may be an image executed through a live broadcasting app or an image received from an external device through an HDMI input (HDMI app).

If the mobile terminal 500 is tagged as the remote control device 200, the mobile terminal 500 may wirelessly connect to the display device 100 and request foreground app information from the display device 100.

That is, the mobile terminal 500 may request information on an application that the display device 100 is running. Application information may include one or more of an application ID, an application name, and an application parameter.

The mobile terminal 500 may receive application information from the display device 100 and determine which application the display device 100 is running.

FIG. 15B is a diagram showing that a reverse mirroring function is executed if the mobile terminal 500 is tagged with the remote control device 200 once. That is, the mobile terminal 500 may receive image data for the image 1510 being displayed by the display device 100 from the display device 100.

The mobile terminal 500 may display a reverse mirroring image 1530 based on the received image data.

The mobile terminal 500 may execute the corresponding application through the ID of the application running on the display device 100 included in the previously received application information, and display the mirroring image 1530 through the executed application.

FIG. 15C is a diagram showing that a mirroring function is executed if the mobile terminal 500 is tagged with the remote control device 200 twice. That is, the mobile terminal 500 may transmit image data for the home screen 15001 being displayed to the display device 100.

The display device 100 may display a mirroring image 1550 based on the received image data.

As such, according to an embodiment of the present disclosure, different NFC-linked functions may be provided according to the number of times the mobile terminal 500 is tagged, and thus various user experiences may be provided.

FIGS. 16A to 17B are diagrams illustrating an NFC interworking function between a mobile terminal and a display device according to another embodiment of the present disclosure.

According to another embodiment of the present disclosure, an interworking function according to NFC tagging may vary according to the type of application being executed in the mobile terminal 500.

The mobile terminal 500 may determine the type of action request based on the type of application being executed.

For example, in FIG. 16A, it is assumed that the mobile terminal 500 is playing a video 1601 through a video playback application. Any application or image being executed by the display device 100 may be used.

After NFC tagging with the remote control device 200, the mobile terminal 500 is wirelessly connected to the display device 100.

The mobile terminal 500 is executing a video playback application and may transmit image data of the video 1601 to the display device 100 in order to execute a mirroring function.

Figure 16B:
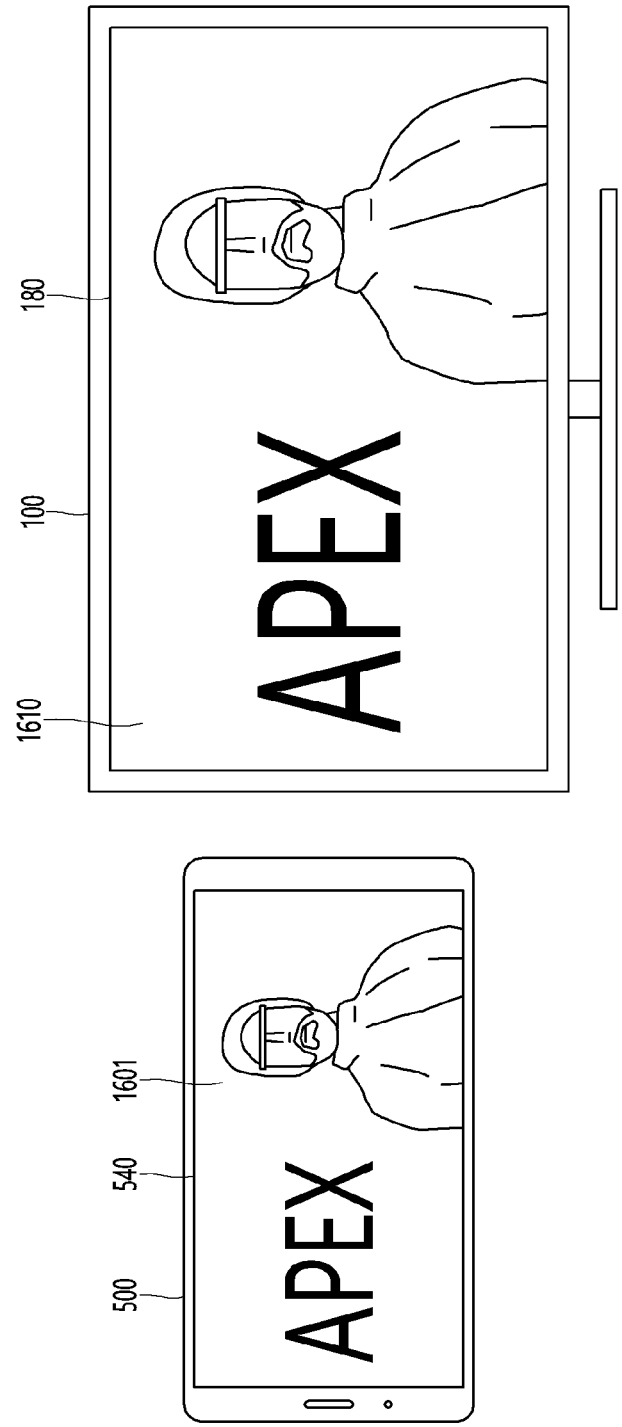

As shown in FIG. 16B, the display device 100 displays a mirroring image 1610 based on the received image data.

That is, if an application being executed by the mobile terminal 500 is an application for content reproduction, an interworking function performed through an NFC tagging operation may be a mirroring function.

Next, FIGS. 17A and 17B will be described.

In FIG. 17A, it is assumed that the mobile terminal 500 displays a gallery screen 1701 through a gallery application that provides stored photos or videos. Any application or image being executed by the display device 100 may be used.

After NFC tagging with the remote control device 200, the mobile terminal 500 is wirelessly connected to the display device 100.

The mobile terminal 500 is running a gallery application and may transmit stored photos and videos to the display device 100 through the gallery application in order to execute a Digital Living Network Alliance (DLNA) function.

As shown in FIG. 17B, the display device 100 may display a DLNA content screen 1710 based on the received photos and videos.

That is, if the application being executed by the mobile terminal 500 is a gallery application, an interworking function performed through an NFC tagging operation may be a DLNA content providing function.

In this way, according to an embodiment of the present disclosure, an NFC interworking function suitable for the type of application being executed by the mobile terminal 500 is applied, so that the user can enjoy a smarter experience.

According to an embodiment of the present disclosure, the above-described method can be implemented as a processor-readable code in a medium on which a program is recorded. Examples of media readable by the processor include ROM, RAM, CD-ROM, magnetic tape, floppy disk, and optical data storage devices, and those can be implemented in the form of carrier waves (eg, transmission through the Internet).

The display device described above is not limited to the configuration and method of the above-described embodiments, but the embodiments may be configured by selectively combining all or part of each embodiment so that various modifications can be made.

The invention claimed is:

1. A mobile terminal comprising:
a display;
a Near Field Communication (NFC) device configured to transmit a NFC tagging signal to a remote control device and receive wireless connection information in response to the NFC tagging signal;
a Wi-Fi transceiver configured to perform a Wi-Fi connection with a display device using the wireless connection information; and
a processor configured to transmit an action request for interworking with the mobile terminal to the display device based on the mobile terminal being connected to the display device via Wi-Fi,
wherein the processor is further configured to:
display a guide screen for guiding a NFC interworking function between the mobile terminal and the display device on the display, according to the NFC tagging of the mobile terminal, and
the guide screen includes a menu for receiving a selection of the NFC interworking function and the menu includes one or more of a mirroring function item, a reverse mirroring function item, an audio reverse mirroring function item, and a content playback function item.

2. The mobile terminal of claim 1, wherein the action request is a request to display a content list including a plurality of content pre-registered in a storage unit of the display device.

3. The mobile terminal of claim 1,
wherein the action request is a request to transmit information on a plurality of contents pre-registered in a storage unit of the display device, and
wherein the processor is configured to receive information on the plurality of pre-registered contents according to the action request, and display the plurality of received pre-registered contents on the display.

4. The mobile terminal of claim 1, wherein the processor is configured to transmit different action requests to the display device according to a number of tagging of the mobile terminal.

5. The mobile terminal of claim 4, wherein:
based on the mobile terminal being tagged for a first time to the remote control device, the processor is configured to receive an image being displayed by the display device, and displays a reverse mirroring image based on the received image on the display, and
based on the mobile terminal being tagged for a second time to the remote control device, the processor is configured to transmit the image being displayed on the display to the display device.

6. The mobile terminal of claim 1, wherein the processor is configured to determine the action request based on a type of application the mobile terminal is running.

7. A display system including a display device, a remote control device and a mobile terminal,
- wherein the display device is configured to transmit wireless connection information to the remote control device, and
- wherein the mobile terminal is configured to:
  - transmit a Near Field Communication (NFC) tagging signal to the remote control device,
  - receive the wireless connection information from the remote control device in response to the NFC tagging signal,
  - perform a wireless connection with the display device based on the received wireless connection information, and
  - transmit an action request for an interworking function to the display device as the wireless connection is performed,
- wherein the mobile terminal comprises a display and is further configured to:
  - display a guide screen for guiding a NFC interworking function between the mobile terminal and the display device on the display, according to the NFC tagging of the mobile terminal, and
  - the guide screen includes a menu for receiving a selection of the NFC interworking function and the menu includes one or more of a mirroring function item, a reverse mirroring function item, an audio reverse mirroring function item, and a content playback function item.

8. The display system of claim 7, wherein the display device is configured to:
- store content registration information including a plurality of contents,
- in response to the action request, display the plurality of contents.

9. The display system of claim 7, wherein the mobile terminal is configured to transmit different action requests to the display device according to a number of tagging of the mobile terminal.

10. The display system of claim 9, wherein:
- based on the mobile terminal is-being tagged for a first time to the remote control device, the mobile terminal is configured to receive an image being displayed by the display device, and displays a reverse mirroring image based on the received image on the display, and
- based on the mobile terminal being tagged for a second time to the remote control device, the mobile terminal is configured to transmit the image being displayed on the display to the display device.

11. The display system of claim 7, wherein the mobile terminal is configured to determine the action request based on a type of application the mobile terminal is running.

* * * * *